US010281583B2

(12) United States Patent
Leibner et al.

(10) Patent No.: US 10,281,583 B2
(45) Date of Patent: May 7, 2019

(54) DETECTION OF SATELLITE SYSTEM ANOMALIES (71) Applicant: The MITRE Corporation, McLean, VA (US)

(72) Inventors: Darrow Paine Leibner, Arlington, VA (US); Robert James Reynolds, North Reading, MA (US); Jeffrey Joseph Robble, Natick, MA (US); Charles Borromeo Dunn, Hudson, NH (US)

(73) Assignee: The MITRE Corporation, McLean, VA (US)

( * ) Notice: Subject to any disclaimer, the term of this patent is extended or adjusted under 35 U.S.C. 154(b) by 528 days.

(21) Appl. No.: 14/816,488

(22) Filed: Aug. 3, 2015

(65) Prior Publication Data

US 2016/0154113 A1    Jun. 2, 2016

Related U.S. Application Data (60) Provisional application No. 62/059,582, filed on Oct. 3, 2014.

(51) Int. Cl.
G01S 19/21     (2010.01)
G01S 19/20     (2010.01)
H04K 3/00      (2006.01)

(52) U.S. Cl.
CPC ............ *G01S 19/215* (2013.01); *G01S 19/21* (2013.01); *G01S 19/20* (2013.01); *H04K 3/90* (2013.01)

(58) Field of Classification Search
CPC ........ G01S 19/21; G01S 19/215; G01S 19/20; H04K 3/90

USPC ........................................ 342/357.59, 357.58
See application file for complete search history.

(56) References Cited

U.S. PATENT DOCUMENTS

| 6,448,925 | B1 | 9/2002 | Shridhara |
| 6,639,541 | B1 | 10/2003 | Quintana et al. |
| 7,471,238 | B2 * | 12/2008 | Lillo ...................... G01S 19/21 |
| | | | 342/357.59 |
| 7,512,492 | B2 | 3/2009 | Irvin et al. |
| 8,294,612 | B2 * | 10/2012 | Abraham ................ G01S 19/21 |
| | | | 342/357.59 |
| 8,838,334 | B2 | 9/2014 | Wendel |
| 8,922,427 | B2 | 12/2014 | Dehnie et al. |
| 9,197,285 | B2 * | 11/2015 | Yu .......................... G01S 19/21 |
| 9,632,183 | B2 * | 4/2017 | Zehnpfennig .......... G01S 19/21 |
| 2003/0218568 | A1 * | 11/2003 | Kober ..................... G01S 19/21 |
| | | | 342/357.29 |
| 2004/0257275 | A1 * | 12/2004 | Yee ....................... G01S 5/0215 |
| | | | 342/357.59 |
| 2008/0291113 | A1 | 11/2008 | Ou-Yang |

(Continued)

*Primary Examiner* — Chuong P Nguyen
(74) *Attorney, Agent, or Firm* — Sterne, Kessler, Goldstein & Fox, P.L.L.C.

(57) ABSTRACT

Disclosed herein are system, apparatus, article of manufacture, method and/or computer program product embodiments for detection of satellite system anomalies. An embodiment operates by receiving satellite signals from a plurality of sources via at least one satellite system receiver and determining the presence of anomalous satellite system activity by comparing an amount of signal strength drop of each of the satellite signals during a time period to a threat detection threshold and by comparing an amount of consistency of the satellite signals during the time period to the threat detection threshold.

23 Claims, 6 Drawing Sheets (56) References Cited

U.S. PATENT DOCUMENTS

| | | | |
|---|---|---|---|
| 2010/0045506 A1* | 2/2010 | Law | H04K 3/22 342/13 |
| 2011/0080319 A1* | 4/2011 | Abraham | G01S 19/21 342/357.59 |
| 2014/0152498 A1* | 6/2014 | Scheitlin | G01S 19/15 342/357.53 |
| 2014/0327573 A1 | 11/2014 | Leibner et al. | |
| 2015/0226857 A1* | 8/2015 | Davies | G01S 19/215 342/357.59 |
| 2015/0226858 A1* | 8/2015 | Leibner | G01S 19/215 342/357.59 |
| 2015/0268350 A1* | 9/2015 | Whitehead | G01S 3/46 342/357.59 |
| 2015/0293234 A1* | 10/2015 | Snyder | G01S 19/13 342/357.59 |

* cited by examiner

DETECTION OF SATELLITE SYSTEM ANOMALIES

CROSS REFERENCE TO RELATED APPLICATIONS

This application claims the benefit of U.S. Provisional Patent Application No. 62/059,582, filed Oct. 3, 2014, titled "DETECTION OF GNSS TIME ANOMALIES BY USING A SMARTPHONE APPLICATION," which is hereby incorporated herein by reference in its entirety.

STATEMENT UNDER MPEP 310

The U.S. government has a paid-up license in this invention and the right in limited circumstances to require the patent owner to license others on reasonable terms as provided for by the terms of Contract No. W15P7T-13-C-A802, awarded by U.S. Army.

BACKGROUND

Digital systems rely on timing subsystems to operate properly. Such timing subsystems are vulnerable to anomalies, which are difficult to detect. When dealing with network security including digital systems, anomalies can be the result of a spoofing or jamming attack. A spoofing attack is a technique used by a hacker or attacker to masquerade or falsify data, unknown to users of the digital system. A jamming attack is a technique used by an attacker to degrade or completely block a data signal.

A Global Navigation Satellite System (GNSS) spoofing attack involves an attempt by a hacker to trick a GNSS receiver, such as a Global Positioning System (GPS) receiver, by broadcasting a signal that is different than the signals received from GPS satellites. The broadcasted signals are designed to appear as normal or standard GPS signals. However, the spoofed signals are modified in such a manner to cause the GPS receiver to produce bad time or timing intervals and/or produce a position at a location determined by the attacker, as opposed to the actual Coordinated Universal Time (UTC) time or the receiver's actual location. Thus, the goal of spoofing in this example is to provide a GPS receiver with a misleading signal and therefore deceive the receiver by using inaccurate, false signals when making positioning and timing calculations.

The reliance on GPS within civil infrastructure is an inherent security vulnerability. Individuals, groups, or nations interested in causing harm can target a GPS reliant system, thereby disrupting or disabling swaths of infrastructure including national critical infrastructure (e.g. the financial and power industries, as well as cellular communication systems and automated teller machines (ATMs)). In particular, the concern is over GPS spoofing, an insidious form of intentional interference whereby a spoofer transmits counterfeit GPS signals to an unsuspecting (and unprotected) receiver. Spoofing is more malignant than jamming, because current civil receivers trust all GPS signals to be true, and therefore cannot warn the user, much less take evasive action, when confronted with counterfeit signals.

While the GPS Precision Code (P-code) is encrypted, and thus is difficult to spoof, the civilian GPS signal, the Coarse/Acquisition code (C/A code), is relatively easier to spoof because the signal structure, the spread spectrum codes, and the modulation methods are open to the public. Insecure civil GPS technology has recently been utilized by critical systems, such as military vehicles, communications systems, banking and finance institutions and the power grid. Consequently, these systems can be severely compromised when subject to a spoofing attack resulting in positioning or timing anomalies.

Further, spoofing and/or jamming becomes more difficult to detect when dealing with mobile assets. Mobile assets are expected to display some movement and change in location, which needs to be accounted for when determining whether location information has been spoofed or not. Mobile assets may also not be able to rely on fixed communication links, and therefore may need to rely on less secure modes of communication for location information. These less secure communication modes may similarly be more susceptible to spoofing and/or jamming. Thus, detecting threats to mobile assets introduces several factors that complicate or render unusable traditional threat detection techniques.

SUMMARY

Provided herein are system, apparatus, article of manufacture, method and/or computer program product embodiments, and/or combinations and sub-combinations thereof, for detection of satellite system anomalies.

An embodiment includes a computer implemented method for detection of satellite system anomalies. The method operates by receiving satellite signals from a plurality of sources via at least one satellite system receiver and determining the presence of anomalous satellite system activity by comparing an amount of signal strength drop of each of the satellite signals during a time period to a threat detection threshold and by comparing an amount of consistency of the satellite signals during the time period to the threat detection threshold.

Another embodiment includes an apparatus for detection of satellite system anomalies. The apparatus includes a memory and at least one processor coupled to the memory. The processor is configured to receive satellite signals from a plurality of sources via at least one satellite system receiver and determine the presence of anomalous satellite system activity by comparing an amount of signal strength drop of each of the satellite signals during a time period to a threat detection threshold and by comparing an amount of consistency of the satellite signals during the time period to the threat detection threshold.

A further embodiment includes a tangible computer-readable device having instructions stored thereon that, when executed by at least one computing device, cause the computing device to perform operations. The operations include receiving satellite signals from a plurality of sources via at least one satellite system receiver and determining the presence of anomalous satellite system activity by comparing an amount of signal strength drop of each of the satellite signals during a time period to a threat detection threshold and by comparing an amount of consistency of the satellite signals during the time period to the threat detection threshold.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

Embodiments are described, by way of example only, with reference to the accompanying drawings. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

DETAILED DESCRIPTION

Figure 1:
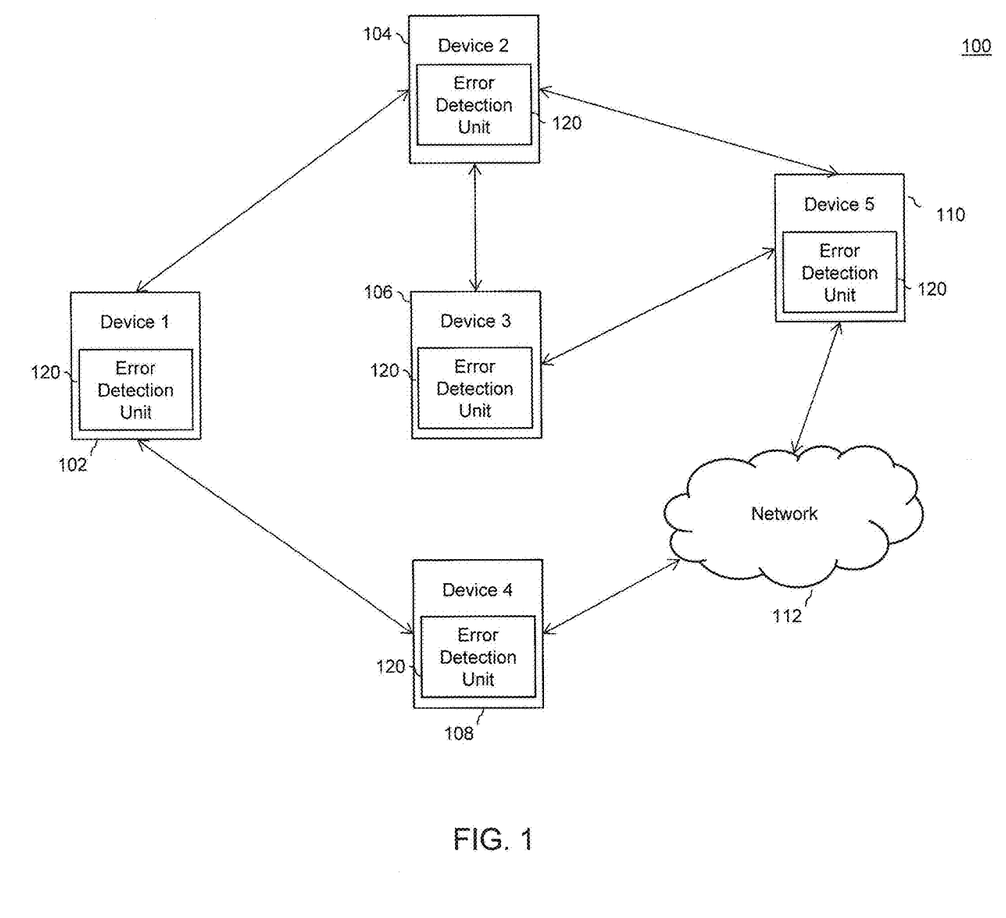
FIG. 1 is a block diagram of a threat detection system, according to an example embodiment.

FIG. 1 is a block diagram illustrating a threat detection system 100, which provides real-time protection of timing and position based systems, according to an embodiment. FIG. 1 includes devices 102, 104, 106, 108, and 110 (which may also be referred to as device 1-5, respectively) and network 112. Devices 102-110 can be any combination of computer systems, such as a computer, server, workstation, mobile device (e.g., a mobile phone, a smartphone, personal digital assistant, navigation device, tablet, laptop or any other user carried device), game console, set-top box, kiosk, embedded system, the computer system depicted in FIG. 6, or other device having at least one processor and memory. Devices 102-110 may include a communication port or input/output (I/O) device for communicating over wired or wireless communication link(s).

Although system 100 is depicted as having five devices and one network in the topology shown, embodiments of the invention support any number of devices and networks and any type of topology. For example, system 100 could alternatively have devices 102-110 interconnected and forming a Mobile Ad-Hoc Network (MANET) with Smart Phone Ad Hoc Network (SPAN). For example, in a SPAN, the onboard Wi-Fi chip of a smartphone can be reconfigured to act as a Wi-Fi router with other nearby similarly configured smartphones, thereby creating an ad hoc mesh network. Wi-Fi is one of many technologies that can be used to form a SPAN. Bluetooth and LTE Direct are other options, but not the only ones. Smartphones in the SPAN can communicate with one another without an operational carrier network, Wi-Fi access point, or any other network infrastructure. Two devices that are too far apart to communicate directly, but share a common neighbor device, can communicate by relaying data across their shared neighbor. This creates a 2-hop chain. Such multi-hop chains can span many more devices deep. The SPAN may be available to any application on the smartphone (e.g., VoIP, Twitter, e-mail etc.).

In an embodiment, any one or combination of devices 102-110 can include one or more GPS antennas, one or more GPS receivers, one or more alternative GNSS antennas, one or more alternative GNSS receivers, an error detection unit 120, a display, or any combination thereof. The one or more GPS receivers are configured to measure the relative time delay of signals from the one or more of GPS satellites or antennas. In general, the one or more GPS antennas and/or the alternative GNSS antennas can each include onboard cesium atomic clocks, as would be apparent to persons having ordinary skill in the art. Accordingly, the relative time delay of signals can be transformed into absolute spatial coordinates and a time coordinate by the one or more GPS receivers and/or alternative GNSS receivers. One or more GPS receivers and/or alternative GNSS receivers can be compromised by a targeted attack, such as a spoofing attack. Such an attack can attempt to modify the associated time coordinates or spatial coordinates, for example, which can result in inaccurate signal information from the one or more GPS receivers and/or alternate GNSS receivers.

As discussed above, GNSS signals are susceptible to various forms of attack, such as spoofing and jamming. The following disclosure provides several example embodiments for detecting various types of threats. For example, techniques are provided to detect jamming such as immediate jamming and over-time jamming, as well as spoofing such as time spoofing, location or spatial spoofing, and signal strength spoofing.

Immediate jamming may refer to situations in which an attacker attempts to degrade a signal strength below a certain threshold to effectively block the signal. Immediate jamming can be detected when signal strength as reported by a GNSS receiver degrades for every satellite that can be seen. Over-time jamming may refer to a situation in which an attacker degrades signal strength of GNSS signals over time, such as when an immediate jamming attack is being initiated or in process but not yet fully realized.

Time spoofing may refer to a situation in which an attacker attempts to alter the time relied on by a target device. Time spoofing can be detected when an elapsed GNSS time or elapsed network time deviates too much from the elapsed system uptime. Location spoofing may refer to a situation in which an attacker attempts to alter the location relied on by a target device. Location spoofing can be detected if the travel speed reported by a GNSS receiver exceeds a specified threshold. Signal strength spoofing may refer to a situation in which an attacker attempts to overpower the GNSS signals using false GNSS signals. Signal strength spoofing can be detected when the signal strength reported by the GNSS receiver for every satellite that can be seen exceeds a specified threshold, indicating a higher than normal or expected GNSS signal strength.

Devices 102-110 can be configured to communicate with each other over network 112. Network 112 can be any network or combination of networks that can carry data communications. Such a network 112 can include, but is not limited to, a local area network, metropolitan area network, cellular network, and/or wide area network that includes the Internet. Alternatively or additionally, devices 102-110 can be configured to communicate over an ad hoc network, such as a Mobile Ad Hoc Network (MANET) or SPAN (Smart Phone Ad Hoc Network), which can be considered one type of implementation of a MANET.

Embodiments provide a suite or plurality of error detection or anti-spoofing techniques (or any combination thereof), which can detect interference with signal information from one or more GPS receivers and/or alternative GNSS receivers. The plurality of error detection techniques are capable of detecting interference based on a plurality of different kinds of time-based and position-based threat situations associated with the one or more GPS antennas, the one or more GPS receivers, the alternative GNSS antennas, and/or the alternative GNSS receivers. The error detection techniques can include interference detection techniques based on the position reported by one or more GPS receivers and/or alternative GNSS receivers, a timing measurement reported by the one or more GPS receivers and/or alternative GNSS receiver, and/or power measurements associated with the one or more GPS antennas, the one or more GPS receivers, the alternative GNSS antennas, and/or the alternative GNSS receivers. Further discussion of the different kinds of detection techniques provided by the error detection unit is discussed below.

In an embodiment, once one or more compromised devices among the one or more GPS receivers and alternative GNSS receiver are detected, the error detection unit is configured to execute one or more anti-spoofing techniques based on an identified threat situation associated with the one or more compromised navigation devices. When an anti-spoofing technique is executed, the error detection unit is configured to generate an alert or message, for example to a network operator via a display, to indicate that there is a discrepancy with at least one characteristic of the one or more GNSS receivers, such as timing signals, spatial coordinates, and/or signal power strength. In this way, a network operator, device user, and/or other user are provided real-time information regarding errors detected by an error detection unit and is immediately alerted to discrepancies, which may serve as an indicator of a compromised system or network. These as well as other uses will be further described below.

Figure 2:
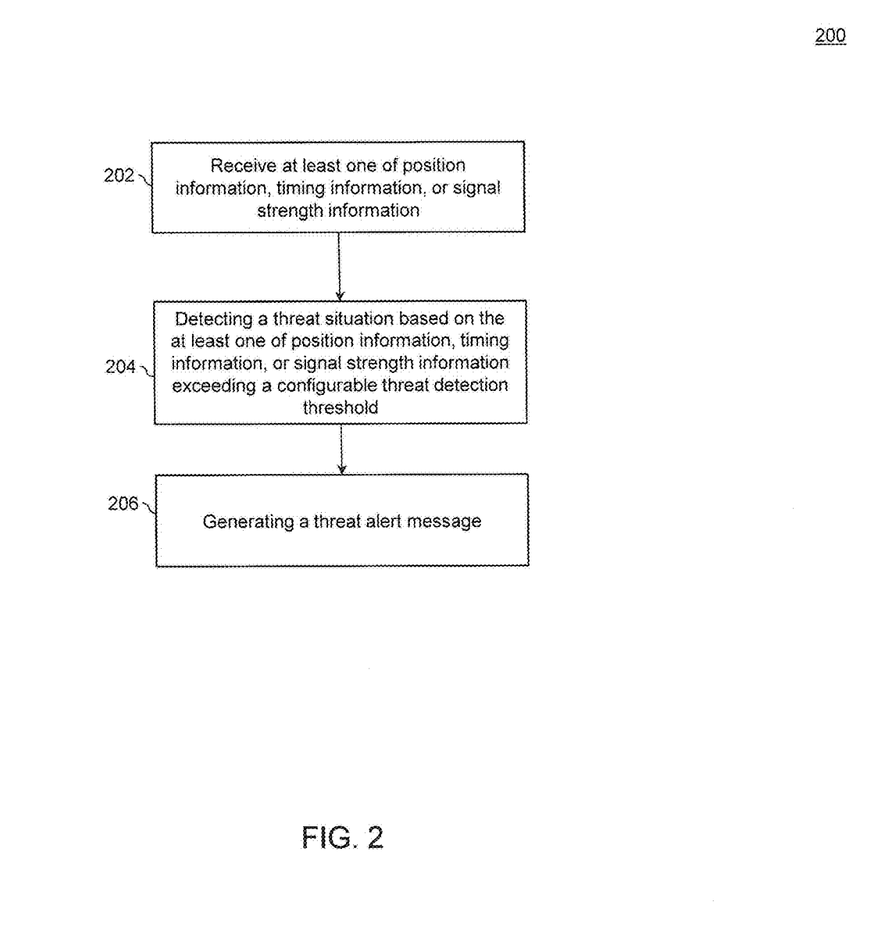
FIG. 2 is a flowchart illustrating a process for detecting a threat, according to an example embodiment.

FIG. 2 is a flowchart illustrating a process 200 for detecting a threat situation, according to an example embodiment. Process 200 can be performed by processing logic that can comprise hardware (e.g., circuitry, dedicated logic, programmable logic, microcode, etc.), software (e.g., instructions run on a processing device), or a combination thereof. In other words, special purpose hardware or a general purpose computer programmed to become a special purpose computer can be used to implement the invention. For example, process 200 may be performed by an error detection unit 120 of any of devices 102-110 or example computer system 600.

At block 202, at least one of position information, timing information, or signal strength information is received. In an embodiment, an error detection unit 120 of any of devices 102-110 or example computer system 600 receives the at least one of position information, timing information, or signal strength information. Position information, timing information, and/or signal strength information may be received from a variety of sources. For example, the position information, timing information, and/or signal strength information may be received from a GPS or GNSS satellite, from a cellular tower or carrier, from an access point, application, device, any other source, or any combination thereof. The position information, timing information, and/or signal strength information can be received from multiple different GNSS networks.

In an embodiment, the types of GNSS networks accessible to the any of the devices in the threat detection network is limited by the respective capabilities of the devices. For example, a Samsung Galaxy S III may support GPS, GLONASS, and QZSS, but other mobile devices may not. In an embodiment, any combination of position information, timing information, or signal strength information is received from one or more National Marine Electronics Association (NMEA) sentences. For example, any one or more of the following NMEA sentence types from the following table can be used.

TABLE 1

| NMEA Type | Description |
| --- | --- |
| $GPGSA | GPS dilution of precision and active satellites |
| $GPGSV | GPS satellites in view |
| $GPRMC | Recommended minimum specific GPS/Transit data |
| $GPGGA | GPS fix data |
| $GNGSA | GLONASS dilution of precision and active satellites |
| $GLGSV | GLONASS satellites in view |
| $QZGSA | QZSS dilution of precision and active satellites |
| $QZGSV | QZSS satellites in view |
| $PGLOR | Proprietary device-specific information |

The NMEA sentences can be obtained using an Application Programming Interface (API). For example, on an Android platform, the NMEA sentences can be accessed through the android.location.GpsStatus.NmeaListener interface. The NmeaListener.onNmeaReceived( ) callback is invoked by the Android framework when new location information is available and provides the NMEA sentence as text and the associated timestamp. In an embodiment, carrier to noise ratio (CNR) data is obtained from the $GPGSV NMEA sentences, which can include data for each of the GPS satellites in view. In an embodiment, a device is not required to have a location fix to detect GNSS jamming attacks.

In an embodiment, error detection unit 120 implements application calls that allow error detection unit 120 to specify how position information, timing information, or signal strength information is received. For example, error detection unit 120 can implement application calls that allow error detection unit 120 to specify one or more data providers, preferred data providers, and other features.

In an embodiment, error detection unit 120 implements application calls that allow error detection unit 120 to specify one or more location provider types. Location provider type can include a GPS provider, GLONASS provider, QZSS provider, other GNSS provider, or network provider. The GPS provider type specifies that position information, timing information, and/or signal strength information is updated based on GPS receiver readings. Similarly, GLONASS, QZSS, or other GNSS provider types specify that position information, timing information, and/or signal strength information is updated based on their respective GNSS sources. The network provider type specifies that position information, timing information, and/or signal strength information is updated based on the availability of cellular tower, Wi-Fi access point, and/or other network lookup.

In an embodiment, error detection unit 120 implements application calls that allow error detection unit 120 to accept optional parameters that determine when location updates are generated by the application's framework for the specified location provider type. These optional parameters include the minimum amount of elapsed time between generating updates and the minimum amount of distance traveled by the device between generating updates. These parameters can be set so that location updates are generated continuously. For example, GPS and network location updates can be set to be obtained at least every two seconds, regardless of distance traveled.

In an embodiment, error detection unit 120 implements application calls that allow error detection unit 120 to select which of the specified location providers is preferred based on any combination of location accuracy, bearing accuracy, horizontal accuracy (e.g. latitude and/or longitude), vertical accuracy (e.g. altitude), if speed information is required, or the maximum allowable power level at which the device should operate to generate location updates (e.g. low, medium, high). In an embodiment, the selection specifies to the device which services to use and which to deactivate when one or more services will be deactivated to preserve battery life.

In an embodiment, position information comprises a location (e.g. relative or absolute) of an object (such as any of devices 102-110), direction of movement of an object, rate movement of an object, or any combination thereof. For example, position information can include the rate of movement of device 102 as a person walks with it.

In an embodiment, timing information comprises a time as reported by GPS or GNSS, time as reported by a device's operating system, an absolute time elapsed since an application has started, or any combination thereof. For example, timing information can be time as reported by device 102's operating system or an absolute time elapsed since the application started executing on device 102. Additionally or alternatively, a device may receive timing information over the network, such as from a cellular tower or Wi-Fi access point.

In an embodiment, signal strength information comprises a CNR, a pattern of CNRs, a pattern of signal strengths, or any combination thereof. For example, signal strength information can the CNR as expressed in the following equation:

$$CNR_{dB} = 10\log_{10}(E_b/N_0) + 10\log_{10}\left(\frac{f_b}{B}\right)$$

In the equation above, $E_b/N_0$ represents the energy per bit to noise power spectral density ratio, $f_b$ represents a channel data rate, and B represents the channel bandwidth. Although this equation provides one manner of calculating a CNR, embodiments are not limited to this equation and support other techniques for determining a CNR.

In an embodiment, a device's GNSS receiver can be disabled and prerecorded or simulated GNSS data (e.g. GPS data in the form of NMEA sentences) can be sent to an application running on the device over a network connection, USB cable, or other connection. This can be useful when determining how the detection algorithms respond to a given GNSS jamming or spoofing scenario and to iteratively improve the detection capability by honing in on the parameters that affect the operating characteristics of those techniques.

In an embodiment, the application is configured to log signal information (such as NMEA sentences) and/or other debug information to the device (e.g. on an SD card, internal storage, etc.) for later offline inspection. The logging functionality can transfer this information over a network connection to a remote server. This will allow users to provide developers with valuable test data that can be used to improve the GNSS jamming and spoofing detection as well as other aspects of the application. The transfer can be performed in real time with an active network connection or on-demand when the user selects the appropriate option.

At block 204, a threat situation is detected based on the at least one of position information, timing information, or signal strength information exceeding a configurable threat detection threshold. In an embodiment, an error detection unit of any of devices 102-110 or example computer system 600 detects the threat situation. Although different kinds of threat detection techniques are discussed herein, these are not intended to be limiting, and a person or ordinary skill in the art would recognize that additional threat detection techniques may be provided by the error detection unit 120 (e.g., the threat detection techniques discussed in U.S. patent application Ser. No. 13/875,672 (filed May 2, 2013) and in U.S. patent application Ser. No. 14/179,607 (filed Feb. 13, 2014), the contents of both of which are hereby incorporated herein by reference in their entireties).

In an embodiment, the threat detection threshold may be configurable by the device or user of the device. For example, the threat detection threshold can be configured for specific scenarios by setting various parameters through an application executing on the device. Configuring the threat detection threshold with these parameters properly is important to achieve high detection rates while minimizing false positives. Optimal values can depend on the device model and various operating conditions, such as if the device is in an urban canyon or open plains, and how fast the user holding the device is moving (standing still, walking on foot, traveling in a vehicle, etc.). A device can be preloaded with provisioning profiles that are suited to address each of these conditions, and the application can automatically switch between them based on device accelerometer readings and/or other sensor data. Additionally or alternatively, the user can select the appropriate profile (or limit the set of profiles the device can choose from) if the user knows the device will be operating in a particular environment or situation, such as a dense urban area with many skyscrapers and buildings, for example. The appropriate profile can be pushed to the device over a Wi-Fi or cellular data network from Command and Control (C2) software running within a sponsor's network operations center. This will allow for remote device management and allow updates to reach devices in real time.

In an embodiment, an application executing on a device, such as an application provided by the error detection unit 120 of any one or more of devices 102-110, monitors a device's location, direction, and/or rate of movement from the position information. The application periodically checks and compares the position information to expected position information. A threat detection threshold can include any measure of deviation from the expected position information, such as by a particular percentage or value. For example, the application detects location spoofing if location has changed beyond a specified threshold distance, if the corresponding velocity required to achieve a change in position exceeds what could be reasonably expected (e.g., travelling faster than a land vehicle when it is known that the device is being carried on foot, or travelling any measure of distance when a device is supposed to remain stationary), or any combination thereof, then the application will report spatial spoofing detection. As another example of detecting location spoofing, a person may be expected to walk at 2 meters per second (m/s), but the device may receive position information that the device is moving at 4 m/s. As yet another example, for multiple stationary devices or user devices for people who are unlikely to be at the same place at the same time, the application can perform a check to ensure that each device reports a unique position at each moment in time. If that condition does not hold true then, at least one of the devices is likely experiencing a spoofing attack. The threat detection threshold can be predetermined and can correspond to a role or status of a device, such as being moved by someone running, being moved by someone expected to run, being moved a land vehicle, being moved by a seafaring vehicle, being moved by an aircraft, etc. The threat detection threshold can be considered to be exceeded when the set or included conditions occur. Alternatively or additionally, the threat detection threshold includes a capture window size, which specifies a number of iterations of GNSS data or number of seconds over which to calculate travel speed.

In an embodiment, an application executing on a device, such as an application provided by the error detection unit 120 of any one or more of devices 102-110, tracks time reported by two or more of three sources: a first time reported by GPS, GNSS, cellular carrier, or network time service; a second time reported by the device's operating system; and a third time reported by the application, such as an absolute time elapsed since the application started. The application periodically checks and compares these times and/or the times elapsed between the checks. The application detects time spoofing if either of the following conditions is true: (1) the first time elapsed or the second time elapsed is negative; or (2) the first time elapsed or the second time elapsed differ from the third time elapsed by a specified threshold, such as by a percentage or value. For example, a percent time deviation setting can specify the minimum percent a GNSS or network time deviates from the third time (the application time) to be considered time spoofing. Alternatively or additionally, the threat detection threshold includes a capture window size, which specifies a number of iterations of GNSS data or number of seconds over which to calculate a time deviation. The threat detection threshold may be set to or include any combination of these conditions. The threat detection threshold can be considered to be exceeded when the set or included conditions occur.

In an embodiment, an application executing on a device, such as an application provided by the error detection unit 120 of any one or more of devices 102-110, tracks signal strength of a GPS and/or GNSS signal. The application periodically checks and compares these signal strengths and/or signal strength patterns to expected signal strengths and/or signal strength patterns. The expected signal strengths and/or signal strength patterns may form all or part of a threat detection threshold. The application detects spoofing and/or jamming if the signal strength information exceeds the threat detection threshold, such as by a percentage or value. For example, based on a device's location and other conditions, a GPS signal's CNR may be expected to be less than 49 dB. However, the measured CNR of an incoming GPS signal may be above 49 dB, which indicates that spoofing and/or jamming is occurring. In an embodiment, an error detection unit of a device determines that spoofing is detected when each satellite that is detected by the device exhibits a signal having CNR equal to or above a predetermined or dynamic threshold. As another example, jamming is detected if all of the GNSS signal strengths corresponding to each of GNSS signal sources is below a specified threshold (e.g. in db/Hz or a percentage). In an embodiment, error detection unit of a device determines that jamming is detected when each satellite that is detected by the device exhibits a signal having CNR (e.g. in db/Hz) equal to or less than a predetermined or dynamic threshold (e.g. in db/Hz or a percentage). The threat detection threshold may be set to or include any combination of these conditions and can be considered to be exceeded when the set or included conditions occur.

In an embodiment, an application executing on a device, such as an application provided by the error detection unit 120 of any one or more of devices 102-110, detects suspicious activity (e.g. jamming) when the GNSS signal strength (e.g. CNR of a GPS signal) reported by the GNSS for a certain percentage of satellites that can be seen consistently drops by a specified amount for a specified period of time. This would indicate a uniform signal strength drop across all of those satellites.

In an embodiment, detecting a threat situation based on at least one of position information, timing information, or signal strength information exceeding a configurable threat detection threshold employs process 500, which is further discussed below with regard to FIG. 5.

In an embodiment, detected threats, their attributes, their classifications, any information used to detect the threats, or any combination thereof are stored to develop a record of the threats over time. This record can be used for a variety of purposes. For example, the threats can be plotted on a map or other display to show the development, appearance, disappearance, and movement of threats over time. Similarly, an analysis of the locations, strengths, and/or severity of threats in a geographic location can be performed without being plotted on a map or other form of display.

In an embodiment, for devices that support multiple satellite systems, the application can compare timing and location information across those systems to validate readings and to look for discrepancies. Discrepancies between timing and location information, such as those discussed above, can indicate the presence of a threat.

Although the foregoing discusses different threat detection thresholds in the context of different threat detection techniques, embodiments support threat detection thresholds supported by multiple threat detection techniques. For example, a threat detection threshold might specify a mix of conditions relating to position information, timing information, signal strength information, or any combination thereof. For example, a threat detection threshold may include a CNR of a GPS signal not to be exceeded as well as the timing conditions discussed above. Furthermore, the threat detection thresholds are not limited to specific conditions discussed herein, and may include, for example, a mix of the conditions discussed herein with other conditions, e.g. probabilities of the presence or absence of a threat supplied from other sources.

At block 206, a threat alert message is generated. In an embodiment, an error detection unit 120 of any of devices 102-110 or example computer system 600 generates the threat alert message. The threat alert message can include an identity and/or location of the device and/or user that discovered and/or is subjected to the threat, a type of threat, the manner of detecting the threat, the values used to detect the threat, one or more types or classifications of threats, other status information about the device that discovered and/or is subjected to the threat, or any combination thereof.

Figure 3:
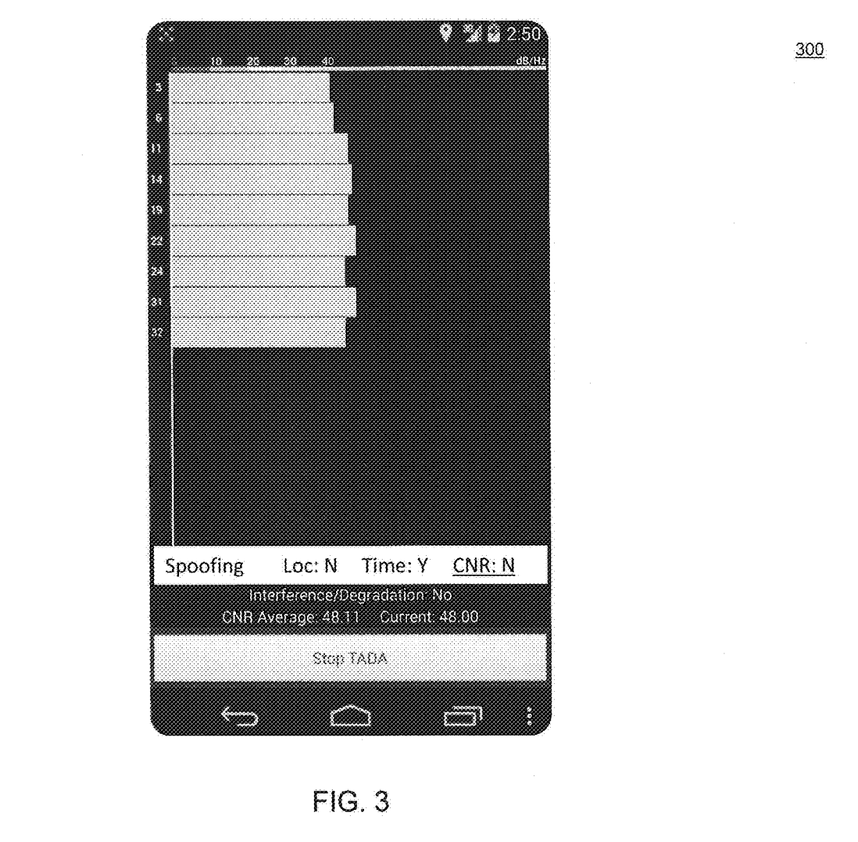
FIG. 3 is an application interface, according to an example embodiment.

FIG. 3 is an example application interface 300, according to an example embodiment. In an embodiment, the error detection unit 120 of a device (e.g., a smartphone) runs the application that provides interface 300. Interface 300 displays the CNRs of signals received from GPS and/or GNSS satellites. In interface 300, the signals may be color coded or shaded to display signals that have been detected as spoofing and/or jamming signals differently than signals that have not been determined to be spoofed and/or jamming signals. However, embodiments support other indicia for identifying the different types of signals. Interface 300 displays other information about potential device threats. For example, the "Spoofing" label combined with other indicia ("Time: Y") indicate that spoofing has been determined based on time information but not based on location information ("Loc: N") or signal strength ("CNR: N"). An indicator (e.g., "CNR: N") may be underlined when more detailed metrics related to that indicator are currently displayed on the interface. As other types of spoofing and/or jamming are detected, the application changes the corresponding values displayed on interface 300 accordingly. In an embodiment, interface 300 may be used by the application to display threat information about one or more other devices, e.g., based on information received in threat alert messages, in a similar manner. The application may run as a background application that does not interfere with other phone applications. If spoofing, jamming, or inadvertent interference is detected, a warning icon will be displayed on the phone's navigation bar. Using the application does not require modification to the smartphone's physical appearance.

In an embodiment, the threat alert message can be used to identify the location of the threat, such as the source of the spoofing and/or jamming information. For example, an error detection unit 120 of any one or more of devices 102-110 receives one or more threat alert messages. From these messages, the device may determine the location of the threat based on the type and/or severity of the threat. For example, if a device detects a spoofed GPS signal based on an unexpectedly high CNR, the device can determine that the spoofed GPS signal is located relatively close to the affected device. The location of the threat (e.g. jamming and/or spoofing equipment) can be geolocated based on the relative signal strength (e.g. CNR) between sensor nodes communicating using an ad-hoc network or other available computer network (e.g. cellular, satellite, etc.). Multiple alert messages can also be used together to identify the source of a threat. For example, alert messages from two devices (e.g., devices 102 and 104) may each indicate that time information is being spoofed from one of at least two towers to which each is in communication. When it is determined that the two devices only have one cellular tower in common, the threat can be attributed to that common tower.

In an embodiment, one or more devices can employ the threat detection techniques discussed herein while being connected through an ad hoc network, such as SPAN. For example, devices 102-110 may each be connected in a SPAN network as shown, for example, by the connections between the devices 102-110 in FIG. 1. Participating in the ad hoc network provides several additional benefits to threat detection. Specifically, the devices on the ad hoc network, as well as other devices configured to receive updates from devices in the ad hoc network, can be provided with situational awareness over a wide area encompassed by the devices on the network. This situational awareness includes information about the presence or absence of threats detected by the devices over a coverage area. As discussed above, the aggregate information from multiple devices can sometimes provide additional and/or more precise information about the location and/or identify of threats that otherwise might not be available when using only information available to a single device. Thus, there is an unexpected synergy between SPAN, which allows devices to effectively communicate with each other without relying on preexisting infrastructure, and the threat detection techniques that ensure the locations shared by the devices are reliable.

Figure 4:
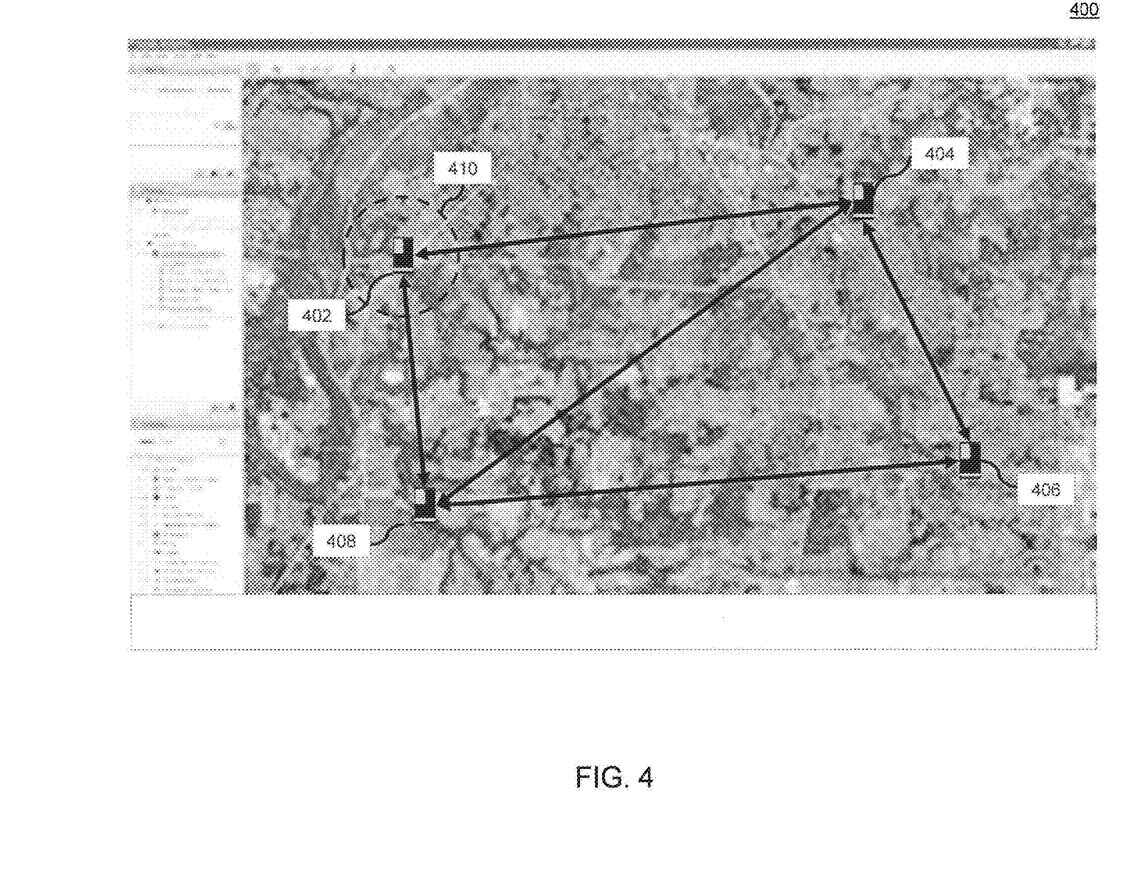
FIG. 4 is an application interface, according to an example embodiment.

FIG. 4 is an application interface, according to an example embodiment. In an embodiment, the error detection unit 120 of a device (e.g., a smartphone) runs the application that provides interface 400. Alternatively or additionally, an application running on another computing device provides interface 400, such as a computing system of a commander, a C2 server, or any computing device with a display and a network connection to a C2 server. Interface 400 displays the status of threats and/or connectivity information about one or more devices 402-408, such as devices 102-110. For example, the circle 410 around the upper-left device indicates that the device has detected a threat that is within the area of the circle. The lines connecting the devices indicate connections established between the devices to form an ad hoc network. The devices can be displayed on a map, such as the one shown in FIG. 4. This combination of information allows users, such as commanders or coordinators, access to real-time information about threats as they correspond to geographic locations. Although FIG. 4 depicts a combination of devices, threat information, and connection information, embodiments of the invention support displaying any number of devices, as well as displaying any number or type of threats, connections, or information related thereto. For example, interface 400 could also be configured to display the locations of adversaries, schools, hospitals, civilians, etc.

The techniques describe herein may serve as a platform for several other uses that benefit from the combination of ad hoc networking and threat detection. For example, sniper detection can use this combination to better identify snipers. For example, units with devices connected to an ad hoc network may come under fire from a sniper. The sniper may be in an area that is being subject to spoofing and/or jamming to make it more difficult to locate and neutralize the sniper. However, the threat detection techniques can be used to determine an estimated area of the sniper's location based on the location of the threat (e.g. spoofing/jamming equipment). For example, the location of the threat can be geolocated based on the relative signal strength (e.g. CNR) between sensor nodes communicating using the ad-hoc network or other available computer network (e.g. cellular, satellite, etc.). Further, the devices can be configured to share audio information (e.g., sound captured by the devices' microphones). The audio information can be processed to provide its own estimated position of the sniper. Then, both estimates can be combined to determine a more accurate location of the sniper.

Figure 5:
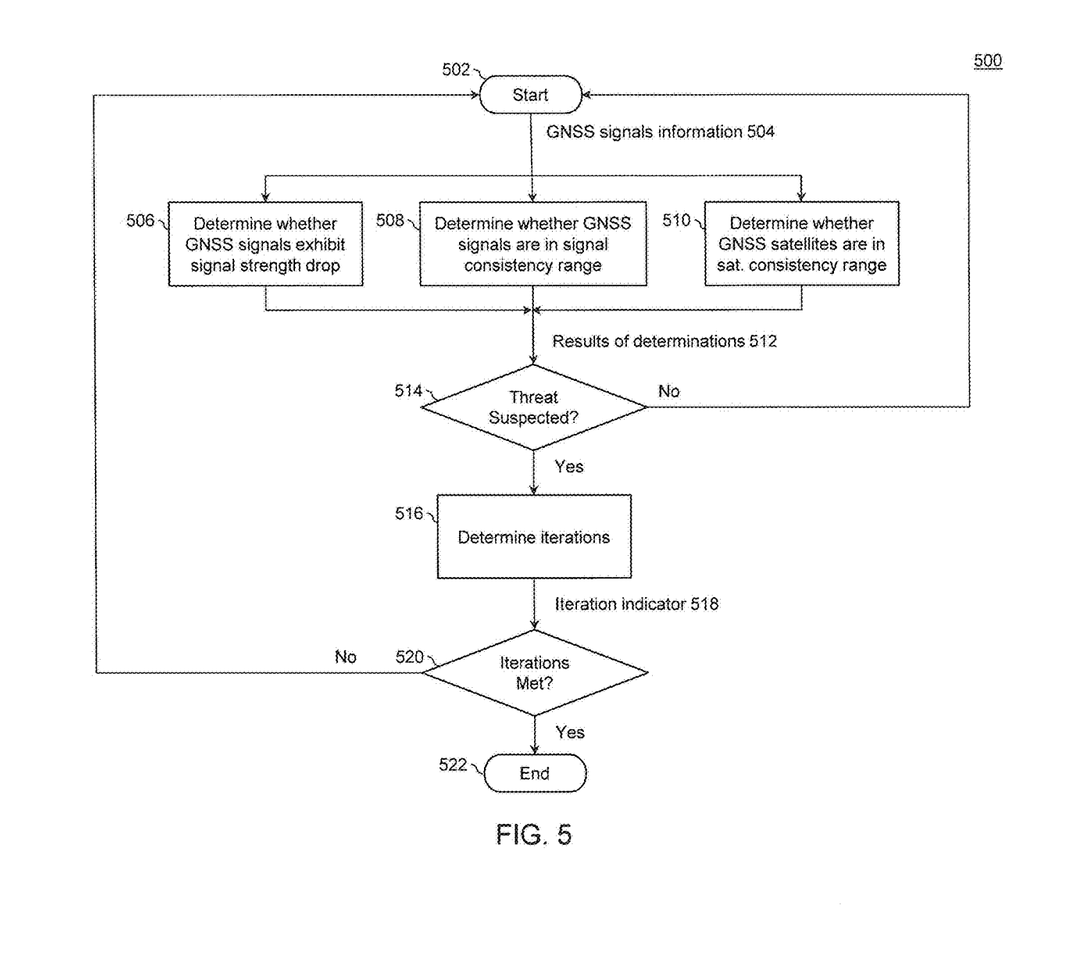
FIG. 5 is a flowchart illustrating a process for detecting a threat, according to an example embodiment.

FIG. 5 is a flowchart illustrating a process 500 for detecting a threat situation, according to an example embodiment. Process 500 can be performed by processing logic that can comprise hardware (e.g., circuitry, dedicated logic, programmable logic, microcode, etc.), software (e.g., instructions run on a processing device), or a combination thereof. In other words, special purpose hardware or a general purpose computer programmed to become a special purpose computer can be used to implement the invention. For example, process 500 may be performed by an error detection unit 120 of any of devices 102-110 or example computer system 600.

Process 500 begins at block 502, at which GNSS signal information 504 is received. In an embodiment, an error detection unit 120 of any of devices 102-110 or example computer system 600 receives the GNSS signal information 504. The GNSS signal information can be the GNSS signals themselves, position information, timing information, signal strength information, or any combination thereof.

Process 500 proceeds to blocks 506, 508, and 510. Blocks 506, 508, and 510 can be performed in any order, such as in parallel, sequentially, or any combination thereof.

At block 506, whether the GNSS signals exhibit a signal strength drop is determined. In an embodiment, an error detection unit 120 of any of devices 102-110 or example computer system 600 determines whether the GNSS signals exhibit a signal strength drop over a time period (e.g. a capture window) that exceeds the configurable threat detection threshold. The determination can be made by comparing one or more values of the GNSS signal information to the configurable threat detection threshold.

In an embodiment, the configurable threat detection threshold comprises a signal strength drop threshold that specifies an amount (e.g. in db/Hz) of drop over the time period that the average signal strength of one or more GNSS signals drops. In an embodiment, the signal strength drop threshold is a drop of 2.5 db/Hz of the average CNR of the GNSS signals per second. Results 512 can indicate whether or not the signal strength drop threshold is met and/or exceeded.

At block 508, whether the GNSS signals are in a signal consistency range is determined. A signal consistency range refers to a range in which the individual satellite signal readings must be over the time period to be considered consistent. In an embodiment, an error detection unit 120 of any of devices 102-110 or example computer system 600 determines whether the GNSS signals are in a signal consistency range, as specified by the configurable threat detection threshold, for the time period. The determination can be made by comparing one or more values of the GNSS signal information to the configurable threat detection threshold. Whether the GNSS signals are in a signal consistency range can comprise part of an amount of consistency of the GNSS signals during the time period. An amount of consistency can specify any combination of measures of consistency of a satellite signal metric, which can include, for example, whether the metric is consistent to itself over time, consistent to the metric of one or more other satellite signals, or consistent to other metrics.

In an embodiment, the configurable threat detection threshold comprises a signal consistency range threshold that specifies a range (e.g. in db/Hz) that the individual GNSS signal readings must be in over the time period to be considered consistent. In an embodiment, the signal consistency range threshold is 0.5-4.5 db/Hz of CNR of the GNSS signals. Results 512 can indicate whether or not the one, more, or all of the GNSS signals fall within or outside of the signal consistency range or the signal consistency range threshold.

At block 510, whether the GNSS signals are in a satellite consistency range is determined. A satellite consistency range refers to a range representing a percent or number of individual satellite signal strength measures that are in a signal consistency range at each point in time over a time period to be considered consistent. In an embodiment, an error detection unit 120 of any of devices 102-110 or example computer system 600 determines whether the GNSS signals are in a satellite consistency range, as specified by the configurable threat detection threshold, for the time period. The determination can be made by comparing one or more values of the GNSS signal information to the configurable threat detection threshold. Whether the GNSS signals are in a satellite consistency range can comprise part of an amount of consistency of the GNSS signals during the time period.

In an embodiment, the configurable threat detection threshold comprises a satellite consistency range threshold that specifies a range (e.g. a value from 0.0-1.0 or a percentage) representing a percent of the number of individual satellite CNR readings that are in signal consistency range at each point in time to be considered consistent. In an embodiment, the satellite consistency range threshold is 0.75-1.00. Results 512 can indicate whether or not the one, more, or all of the GNSS signals fall within or outside of the satellite consistency range or the satellite consistency range threshold.

At block 514, whether a threat is suspected is determined based on results 512. In an embodiment, an error detection unit 120 of any of devices 102-110 or example computer system 600 determines whether a threat is suspected when results 512 indicate that the GNSS signals (i) exhibit a signal strength drop over the time period that exceeds the configurable threat detection threshold; (ii) are in a signal consistency range, as specified by the configurable threat detection threshold, for the time period; and (iii) are in a satellite consistency range, as specified by the configurable threat detection threshold, for the time period. Alternatively, whether a threat is suspected is determined when any one or combination of (i), (ii), or (iii) are met for the GNSS signals. If it is determined from the results 512 that a threat is suspected, process 500 proceeds to block 516. If it is not determined that a threat is suspected, process 500 proceeds to block 502. Alternatively, process 500 can proceed to block 522 and end if it is not determined that a threat is suspected.

At block 516, the number of iterations that a threat has been determined to be suspected (e.g. by the determination of block 514) within the time period is determined. In an embodiment, an error detection unit 120 of any of devices 102-110 or example computer system 600 determines the number of iterations. In an embodiment, the number of iterations is determined by referencing a memory or other storage location that stores the number of iterations that a threat has been determined to be suspected within the time period. Error detection unit 120 of any of devices 102-110 or example computer system 600 can update the memory or other storage location when it is determined that another qualifying iteration has occurred.

At block 520, whether the number of iterations that a threat has been determined to be suspected (e.g. by the determination of block 514) within the time period has been met is determined. In an embodiment, an error detection unit 120 of any of devices 102-110 or example computer system 600 determines whether the number of iterations has been met. The number of iterations can be specified by the threat detection threshold. If it is determined from the iteration indicator 518 that a number of iterations has been met, process 500 proceeds to block 522 and ends. A threat situation is detected when block 520 determines that the number of iterations is met and block 514 determines that a threat is suspected. In response to detecting the threat situation, an alert message can be generated, for example, using the techniques described regarding block 206 or other techniques discussed herein.

At block 520, if it is not determined that a number of iterations has been met, process 500 proceeds to block 502. Alternatively, process 500 can proceed to block 522 and end if it is not determined that a number of iterations has been met.

Although this disclosure and the embodiments herein have been described with respect to a GNSS by way of non-limiting example, the embodiments herein are applicable to any type of navigation, satellite, or communication system, as would be understood by a person of ordinary skill in the art. Thus, it is to be appreciated that the descriptions of embodiments for detection of GNSS anomalies also apply to embodiments for detection of satellite system, navigation system, or communication system anomalies.

Example Computer System

Figure 6:
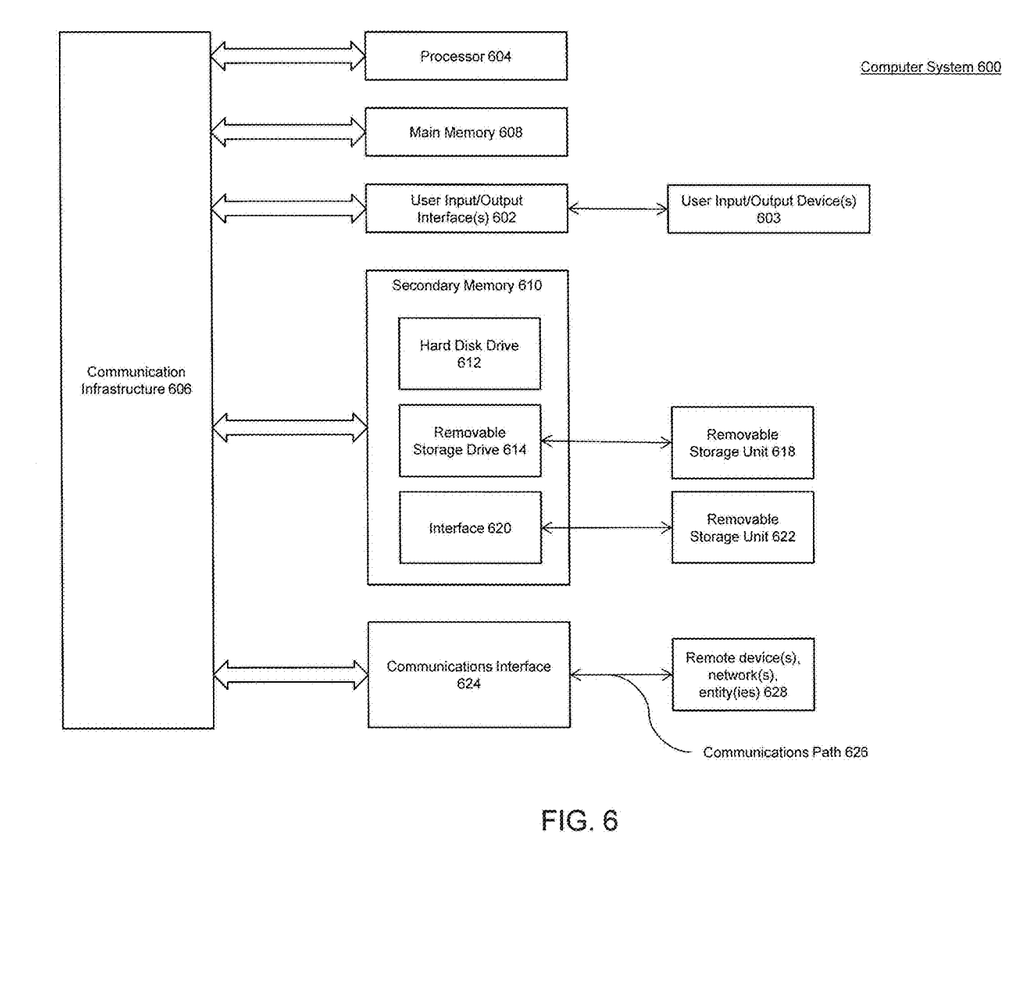
FIG. 6 is an example computer system useful for implementing various embodiments.

Various embodiments can be implemented, for example, using one or more well-known computer systems, such as devices 102-110 shown in FIG. 1. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired, and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
   at least one satellite system receiver;
   a memory; and
   at least one processor coupled to the memory and the satellite system receiver and configured to:
   receive satellite signals from a plurality of sources via the at least one satellite system receiver;
   determine a suspected threat by:
   comparing an amount of signal strength drop of each of the satellite signals during a time period to a configurable threat detection threshold;
   comparing an amount of consistency of the satellite signals during the time period to the configurable threat detection threshold, the amount of consistency determined from a plurality of measures of a satellite signal metric;
   detecting the suspected threat based on at least one of the comparing the amount of signal strength drop and the comparing the amount of consistency of the satellite signals; and
   updating a threat parameter based on the detected suspected threat; and
   detect a threat based on the updated threat parameter, wherein the threat parameter comprises an iteration count and updating the threat parameter comprises incrementing the iteration count based on the detected suspected threat.

2. The system of claim 1, wherein to determine the presence of anomalous satellite system activity the at least one processor is configured to:
   determining the suspected threat based on a number of consecutive times a consistent signal strength drop occurs during the time period.

3. The system of claim 1, wherein the amount of consistency comprises:
   a signal strength range in which the satellite signals fall during the time period, and
   a threshold amount of source signal strengths that are considered consistent during the time period.

4. The system of claim 1, wherein the amount of signal strength drop occurs during a specified number of consecutive times during the time period.

5. The system of claim 4, wherein the specified number of consecutive times is specified by the configurable threat detection threshold.

6. The system of claim 1, the at least one processor further configured to:
   generate an alert of the suspected threat.

7. The system of claim 1, the at least one processor further configured to:
   determine a location of the source of the suspected threat.

8. The system of claim 1, wherein the satellite system comprises a Global Navigation Satellite System.

9. The system of claim 1, wherein to detect the threat the at least one processor is configured to compare the iteration count to the configurable threat detection threshold.

10. A computer implemented method for satellite system threat detection, comprising:
    receiving, by at least one processor, satellite signals from a plurality of sources via at least one satellite system receiver;
    determining, by the at least one processor, a suspected threat by:
    comparing an amount of signal strength drop of each of the satellite signals during a time period to a configurable threat detection threshold;
    comparing an amount of consistency of the satellite signals during the time period to the configurable threat detection threshold, wherein the amount of consistency is determined from a plurality of measures of a satellite signal metric;
    detecting the suspected threat based on at least one of the comparing the amount of signal strength drop and the comparing the amount of consistency of the satellite signals; and
    updating a threat parameter based on the detected suspected threat, wherein the threat parameter comprises an iteration count and updating the threat parameter comprises incrementing the iteration count based on the detected suspected threat; and
    detecting a threat based on the updated threat parameter.

11. The method of claim 10, the determining further comprising:
    determining the suspected threat based on a number of consecutive times a consistent signal strength drop occurs during the time period.

12. The method of claim 10, wherein the amount of consistency comprises:
    a signal strength range in which the satellite signals fall during the time period, and
    a threshold amount of source signal strengths that are considered consistent during the time period.

13. The method of claim 10, wherein the amount of signal strength drop occurs during a specified number of consecutive times during the time period.

14. The method of claim 13, wherein the specified number of consecutive times is specified by the configurable threat detection threshold.

15. The method of claim 10, further comprising:
    generating an alert of the suspected threat.

16. The method of claim 10, further comprising:
    determining a location of the source of the suspected threat.

17. The method of claim 10, wherein detecting the threat comprises comparing the iteration count to the configurable threat detection threshold.

18. A non-transitory computer-readable device having instructions stored thereon that, when executed by at least one computing device, causes the at least one computing device to perform operations comprising:
    receiving satellite signals from a plurality of sources via at least one satellite system receiver;
    determining a suspected threat by:
    comparing an amount of signal strength drop of each of the satellite signals during a time period to a configurable threat detection threshold;
    comparing an amount of consistency of the satellite signals during the time period to the configurable threat detection threshold, wherein the amount of consistency is determined from a plurality of measures of a satellite signal metric;
    detecting the suspected threat based on at least one of the comparing the amount of signal strength drop and the comparing the amount of consistency of the satellite signals; and
    updating a threat parameter based on the detected suspected threat, wherein the threat parameter comprises an iteration count and updating the threat parameter comprises incrementing the iteration count based on the detected suspected threat; and
    detecting a threat based on the updated threat parameter.

19. The non-transitory computer-readable device of claim 18, the determining comprising:

determining the suspected threat based on a number of consecutive times a consistent signal strength drop occurs during the time period.

20. The non-transitory computer-readable device of claim 18, wherein the amount of consistency comprises:
a signal strength range in which the satellite signals fall during the time period, and
a threshold amount of source signal strengths that are considered consistent during the time period.

21. The non-transitory computer-readable device of claim 18, wherein the amount of signal strength drop occurs during a specified number of consecutive times during the time period.

22. The non-transitory computer-readable device of claim 21, wherein the specified number of consecutive times is specified by the configurable threat detection threshold.

23. The non-transitory computer-readable device of claim 18, wherein detecting the threat comprises comparing the iteration count to the configurable threat detection threshold.

* * * * *